United States Patent
Ohbayashi et al.

(10) Patent No.: US 8,838,351 B2
(45) Date of Patent: Sep. 16, 2014

(54) VEHICLE DRIVE CONTROL DEVICE

(75) Inventors: Motonari Ohbayashi, Nisshin (JP); Yuki Minase, Toyota (JP); Shinya Kodama, Toyota (JP); Toshihiro Takagi, Toyota (JP); Masashi Takagi, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/126,639

(22) PCT Filed: Jun. 23, 2011

(86) PCT No.: PCT/JP2011/064482
§ 371 (c)(1),
(2), (4) Date: Dec. 16, 2013

(87) PCT Pub. No.: WO2012/176323
PCT Pub. Date: Dec. 27, 2012

(65) Prior Publication Data
US 2014/0136061 A1    May 15, 2014

(51) Int. Cl.
*B60W 10/04* (2006.01)
*B60W 10/10* (2012.01)
*B60W 30/18* (2012.01)
*B60W 50/10* (2012.01)
*B60W 10/06* (2006.01)
*B60W 50/08* (2012.01)

(52) U.S. Cl.
CPC ......... *B60W 10/10* (2013.01); *B60W 30/18027* (2013.01); *B60W 2540/10* (2013.01); *B60W 50/10* (2013.01); *B60W 2540/16* (2013.01); *B60W 10/06* (2013.01); *B60W 2710/0666* (2013.01); *B60W 50/087* (2013.01); *B60W 10/04* (2013.01)
USPC ........................................... 701/54; 477/111

(58) Field of Classification Search
CPC . B60W 10/04; B60W 10/10; B60W 2510/10; B60W 2720/106
USPC ................................ 701/54, 58; 477/109, 111
See application file for complete search history.

(56) References Cited

U.S. PATENT DOCUMENTS

| 6,392,535 | B1* | 5/2002 | Matsuno et al. ............. 340/441 |
| 2009/0054205 | A1* | 2/2009 | Maekawa et al. ............. 477/109 |
| 2010/0006358 | A1 | 1/2010 | Ishikawa |

FOREIGN PATENT DOCUMENTS

| JP | 61-190135 A | 8/1986 |
| JP | 2010-18174 A | 1/2010 |
| WO | 2012/176322 A1 | 12/2012 |

* cited by examiner

*Primary Examiner* — Edwin A Young
(74) *Attorney, Agent, or Firm* — Sughrue Mion, PLLC

(57) ABSTRACT

When a driver attempts to hurriedly start driving a stopped vehicle, for example, the driver may, without realizing it, begin operating an accelerator pedal before shifting a shift lever from a non-drive position to a drive position. In such a situation, when the shift lever is shifted from a non-drive position to a drive position while the accelerator pedal is being operated, a drive power limiting process is implemented for limiting the drive power when the drive power is output from a drive source in accordance with the amount that the accelerator is being operated. As a result, when the shift lever is shifted from a non-drive position to a drive position in the abovementioned manner, it is possible to restrict starting of the vehicle, which is caused by the transmission of drive power from the drive source to the wheels. This reduces the strange sensation experienced by the driver.

4 Claims, 3 Drawing Sheets

VEHICLE DRIVE CONTROL DEVICE

CROSS REFERENCE TO RELATED APPLICATIONS

This application is a National Stage of International Application No. PCT/JP2011/064482 filed Jun. 23, 2011, the contents of which are incorporated herein by reference in their entirety.

TECHNICAL FIELD

The present invention relates to an operation control device for vehicles.

BACKGROUND ART

As shown in Patent Document 1, a vehicle such as an automobile has a control section for adjusting drive force generated by a drive source in accordance with manipulation of an accelerator by the driver. The drive force of the drive source is transmitted to the wheels of the vehicle, thus allowing the vehicle to move. The vehicle also has a shift mechanism that is switched between a drive position and a non-drive position by the driver. When the shift mechanism is at the drive position, the drive force is transmitted from the drive source to the wheels. When the shift mechanism is at the non-drive position, such transmission of the drive force from the drive source to the wheels is blocked.

PRIOR ART DOCUMENT

Patent Document

Patent Document 1: Japanese Laid-Open Patent Publication No. 61-190135

SUMMARY OF THE INVENTION

Problems that the Invention is to Solve

To start the vehicle from the stopped state, the driver switches the shift mechanism from the non-drive position to the drive position usually before operating the accelerator from the OFF state to the ON state. However, there may be a case where the driver is in a hurry and inadvertently manipulates the accelerator from the OFF state to the ON state before switching the shift mechanism from the non-drive position to the drive position. In other words, while mistakenly assuming that he/she is performing the normal procedure, the driver operates in an unusual manner in which the shift mechanism is changed from the non-drive position to the drive position with the accelerator held in the ON state.

As a result of the above-described unintended unusual operation by the driver, actual behavior of the vehicle is not what the driver expects would happen. Specifically, the driver expects that the vehicle starts when he/she operates the accelerator to the ON state. However, the vehicle actually starts when the drive force is transmitted from the drive source to the wheels by switching the shift mechanism from the non-drive position to the drive position, which is after the accelerator has been operated to the ON state. In other words, the vehicle is started through transmission of the drive force from the drive source to the wheels, which is brought about by switching the shift mechanism from the non-drive position to the drive position with the accelerator held in the ON state. This inevitably causes a strange sensation for the driver and thus decreases drivability of the vehicle.

According to the technique disclosed in Patent Document 1, the drive force of the drive source is reduced to such a level as to prevent the vehicle from moving if the force or speed of depression of the accelerator pedal exceeds a detection level when the transmission in the path of the drive force transmission from the drive source to the wheels has a great gear ratio. However, even the technique of Patent Document 1 cannot prevent the drivability of the vehicle from being lowered by the strange sensation experienced by the driver, which is caused under the aforementioned condition. Specifically, in some cases, the technique does not decrease the drive force generated by the drive source when the shift mechanism is switched from the non-drive position to the drive position with the accelerator held in the ON state. In these cases, the drive force is transmitted from the drive source to the wheels, thus starting the vehicle.

Accordingly, to solve the above-described problem, an objective of the present invention is to provide a drive control device for a vehicle that prevents the driver from experiencing a strange sensation when a shift mechanism is switched from a non-drive position to a drive position with the accelerator held in an ON state and thus maintains drivability of the vehicle without being lowered by such strange sensation.

Means for Solving the Problems

To achieve the foregoing objective, a drive control device for a vehicle according to the present invention executes a drive force limiting process to decrease drive force of a drive source when the drive force is to be output in accordance with operation of an accelerator in cases where a shift mechanism is switched from a non-drive position to a drive position with an accelerator held in an ON state. Specifically, these cases include a case where the driver is in a hurry and, in an attempt to start the vehicle quickly, operates the accelerator from the OFF state to the ON state inadvertently before switching the shift mechanism from the non-drive position to the drive position. In this case, when the shift mechanism is switched from the non-drive position to the drive position with the accelerator held in the ON state, transmission of the drive force from the drive source to the wheels is initiated and the vehicle is started. This causes the driver to feel strange. However, under this condition, the drive force limiting process is carried out to decrease the drive force output from the drive source, thus preventing the driver from feeling strange. That is, the strange sensation caused by switching of the shift mechanism from the non-drive position to the drive position with the accelerator held in the ON state is prevented from being caused. Drivability of the vehicle is thus prevented from being lowered by such strange sensation.

In accordance with one aspect of the present invention, in the drive force limiting process executed by the control section, the degree of limiting of the drive force output from the drive source is changed in accordance with the acceleration of the vehicle. In this case, through the drive force limiting process, the degree of limiting of the drive force of the drive source is increased as the acceleration of the vehicle is increased. More specifically, when the acceleration of the vehicle is less than a determination value, the degree of limiting of the drive force of the drive source may be set to zero. If the acceleration of the vehicle is greater than or equal to the determination value, the degree of limiting of the drive force of the drive source may be set to a value greater than zero. It is preferable to variably set the determination value as a function of the traveling speed of the vehicle.

Through the drive force limiting process, which is carried out in the above-described manner, unnecessary decrease of the drive force of the drive source is avoided and the drive force is decreased without causing the driver to feel strange. Also, for a case where the vehicle is mired and needs to escape, the driver repeatedly switches the shift mechanism between a non-drive position and a drive position. In this case, the shift mechanism may be switched from the non-drive position to the drive position with the accelerator held in an ON state. However, under this condition, the acceleration of the vehicle tends to remain low even when the shift mechanism is switched from the non-drive position to the drive position with the accelerator held in the ON state. The degree of limiting of the drive force output from the drive source is thus maintained low in the drive force limiting process. This prevents the operation for moving the vehicle out of a mire from being hampered by the drive force limiting process, through which the drive force is decreased. The drivability of the vehicle is thus improved for the time when, for example, the vehicle is moved out of a mire.

In accordance with another aspect of the present invention, in the drive force limiting process executed by the control section, the degree of limiting of the drive force of the drive source is set to a value greater than zero without being influenced by the magnitude relationship between the acceleration of the vehicle and the determination value, when the traveling speed is greater than or equal to a reference value. In this case, if the vehicle speed is relatively great, that is, is the driver is likely to feel strange, the drive force limiting process is carried out to reliably decrease the drive force of the drive source, thus preventing the driver from experiencing a strange sensation.

MODES FOR CARRYING OUT THE INVENTION

An embodiment of a drive control device for an automobile according to the present invention will now be described with reference to FIGS. 1 to 4.

Figure 1:
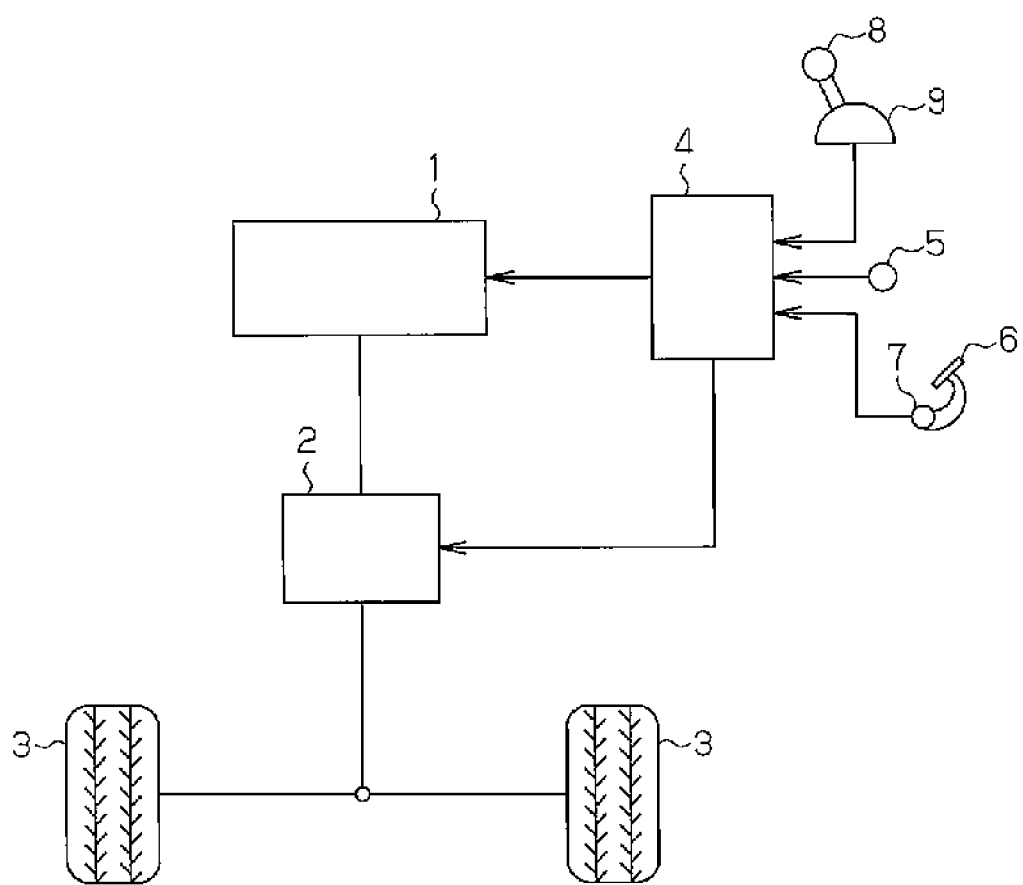
FIG. 1 is a schematic view showing an automobile, as a whole, employing a drive control device according to one embodiment of the present invention.

As shown in FIG. 1, the automobile has an internal combustion engine serving as a drive source 1. The drive force generated by the drive source 1 is transmitted to wheels 3 via a transmission 2 to rotate the wheels 3, thus moving the automobile. The transmission 2 has a plurality of gears. The gears may be combined in different manners in correspondence with a plurality of predetermined variable speeds. The transmission 2 selectively permits and blocks transmission of the drive force from the drive source 1 to the wheels 3. In other words, the transmission 2 functions as a drive force transmitting-blocking device.

The automobile has an electronic control unit 4 for carrying out various types of control procedures related to the drive source 1 and the transmission 2. Various types of sensors are connected to the electronic control unit 4, including a traveling speed sensor 5 for detecting the traveling speed of the automobile, an accelerator position sensor 7 for detecting the operating amount of an accelerator pedal 6 (the accelerator operating amount), which is depressed by the driver of the automobile, and a shift position sensor 9 for generating a signal corresponding to the position of a shift lever 8 (a shift mechanism), which is manipulated by the driver of the automobile. Drive circuits for driving the drive source 1 or the transmission 2 are connected to the electronic control unit 4.

The electronic control unit 4 adjusts the drive force output from the drive source 1 in accordance with the accelerator operating amount. The electronic control unit 4 switches the transmission 2 among the variable speeds and selectively permits and blocks transmission of the drive force from the drive source 1 to the wheels 3 in accordance with the accelerator operating amount, the traveling speed, and the operating position of the shift lever 8. Specifically, the shift lever 8 is switched among a plurality of operating positions such as a parking position, a reverse position, a neutral position, and a forward-gear position. The operating modes of the transmission 2 for the respective operating positions of the shift lever 8 will hereafter be described.

When the shift lever 8 is switched to the parking position, the electronic control unit 4 operates the transmission 2 to cause such a gear engagement as to prohibit rotation of the wheels 3 and block transmission of the drive force from the drive source 1 to the wheels 3. When the shift lever 8 is changed to the neutral position, the electronic control unit 4 operates the transmission 2 to permit the rotation of the wheels 3, which has been prohibited by the aforementioned gear engagement in the transmission 2, and block the transmission of the drive force from the drive source 1 to the wheels 3. That is, when the shift lever 8 is at the parking position or the neutral position, it is defined that the shift lever 8 is at an operating position for blocking the drive force transmission from the drive source 1 to the wheels 3 (hereinafter, a "non-drive position").

When the shift lever 8 is switched to the forward-gear position, the electronic control unit 4 operates the transmission 2 to transmit the drive force from the drive source 1 to the wheels 3 in a forward rotating direction. When the shift lever 8 is changed to the reverse position, the electronic control unit 4 operates the transmission 2 to transmit the drive force from the drive source 1 to the wheels 3 in a reverse rotating direction. In other words, when the shift lever 8 is at the forward-gear position or the reverse position, it is defined that the shift lever 8 is at an operating position for transmitting the drive force from the drive source 1 to the wheels 3 (hereinafter, a "drive position").

To start the automobile from a stopped state, the driver switches the shift lever 8 from a non-drive position such as the parking position to a drive position such as the forward-gear position or reverse position usually before depressing the accelerator pedal 6 from the OFF state to the ON state. However, there may be a case where the driver is in a hurry and inadvertently depresses the accelerator pedal 6 from the OFF state to the ON state (operates the accelerator pedal 6 to the ON state) before switching the shift lever 8 from the non-drive position to the drive position. In other words, while mistakenly assuming that he/she is performing the normal procedure, the driver actually operates in an unusual manner in which the shift lever 8 is switched from the non-drive position to the drive position with the accelerator pedal 6 held in the ON state.

As a result of the above-described unintentional unusual operation by the driver, actual behavior of the automobile is not what the driver expects would happen. Specifically, the driver expects the automobile to start when the accelerator pedal 6 is depressed to the ON state. However, the automobile actually starts when the shift lever 8 is switched from the non-drive position to the drive position, which causes transmission of the drive force from the drive source 1 to the wheels 3, after the accelerator pedal 6 has been depressed. That is, when the shift lever 8 is switched from the non-drive position to the drive position with the accelerator pedal 6 held in the ON state, the drive force is transmitted from the drive source 1 to the wheels 3 and the automobile starts. This inevitably causes the driver to feel strange, thus degrading drivability of the automobile.

To solve this problem, in the illustrated embodiment, a drive force limiting process is carried out to decrease the drive force of the drive source 1 when the drive force is to be output in accordance with the accelerator operating amount, if the shift lever 8 is switched from the non-drive position to the drive position with the accelerator pedal 6 held in the ON state. Accordingly, the drive force limiting process is performed if the driver is in a hurry and, in an attempt to start the automobile quickly, inadvertently depresses the accelerator pedal 6 from the OFF state to the ON state before switching the shift lever 8 from the non-drive position to the drive position to start the automobile from the stopped state. In other words, when the shift lever 8 is switched from the non-drive position to the drive position by the driver with the accelerator pedal 6 maintained in the ON state, the drive force limiting process is carried out to decrease the drive force output from the drive source 1. As a result, when the shift lever 8 is switched from the non-drive position to the drive position in the above-described manner, the drive force is prevented from being transmitted from the drive source 1 to the wheels 3 to start the automobile, causing the driver to feel strange. This prevents the driver from feeling strange due to switching of the shift lever 8 from the non-drive position to the drive position with the accelerator pedal 6 held in the ON state, thus maintaining the drivability of the automobile without being lowered by such strange sensation.

Figure 2:
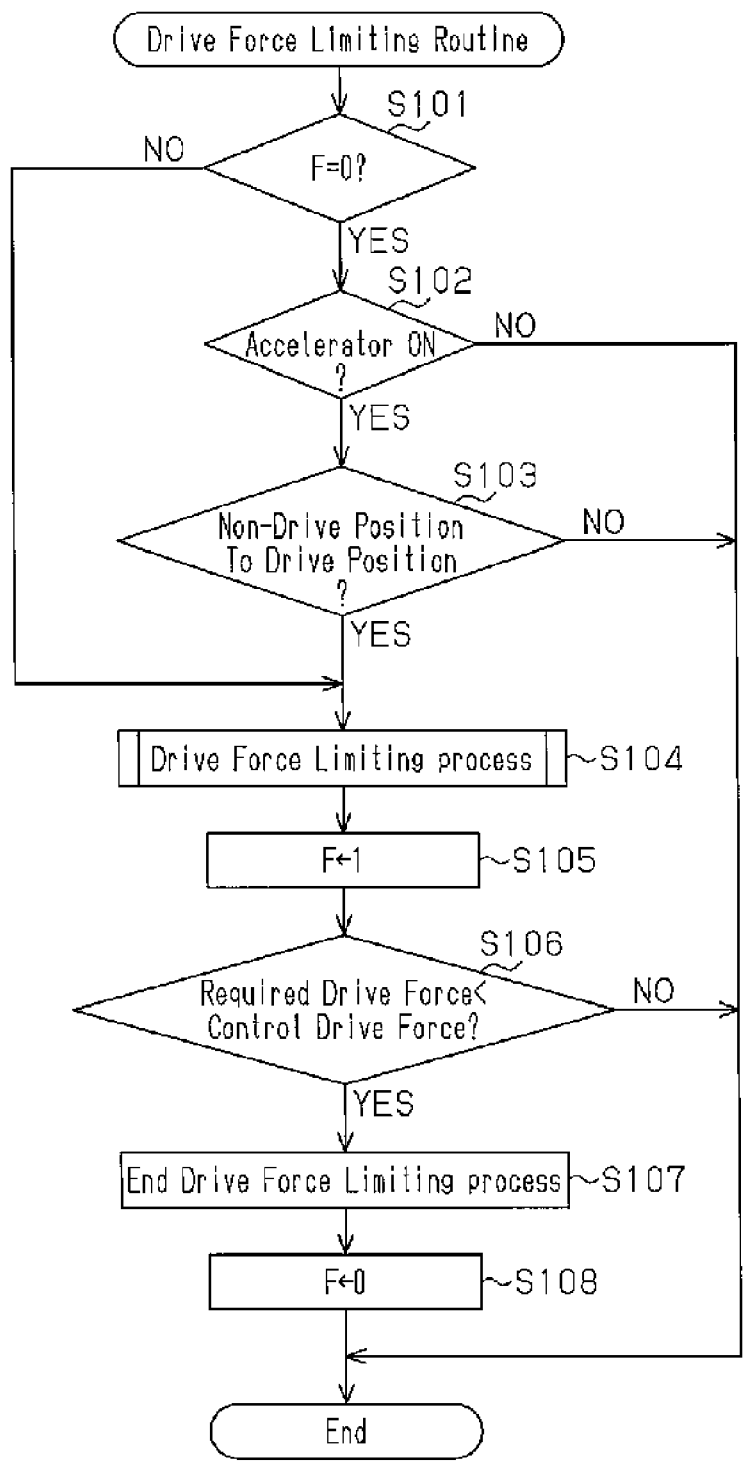
FIG. 2 is a flowchart representing execution steps of a drive force limiting process.

The steps for executing the drive force limiting process will hereafter be described with reference to the flowchart shown in FIG. 2, which represents a drive force limiting routine. The drive force limiting routine is performed by the electronic control unit 4 periodically through, for example, interruption at predetermined time intervals.

According to the routine, to determine whether the drive force limiting process is currently carried out, it is determined whether the flag F is zero (indicating that the procedure is currently suspended) (S101). If a positive determination is made in step S101, determination whether the accelerator pedal 6 is in the ON state (S102) is carried out followed by determination whether the shift lever 8 has been switched from a non-drive position to a drive position (S103). Specifically, it is determined that the shift lever 8 has been switched from the non-drive position to the drive position if, for example, the shift lever 8 has been switched from the parking position or the neutral position to the forward-gear position or the reverse position by the driver. If the neutral position is located, for example, between the forward-gear position and the reverse position, it is determined that the shift lever 8 has been switched from the non-drive position to the drive position when the shift lever 8 is repeatedly switched between the forward-gear position and the reverse position by the driver. If the accelerator pedal 6 is in the ON state and the shift lever 8 has been switched from the non-drive position to the drive position, positive determinations are made in both steps S102 and S103 and the drive force limiting process is carried out (S104). When the drive force limiting process is executed in this manner, the flag F is set to 1 (indicating that the procedure is currently executed) (S105). If the flag F is 1 (indicating current execution of the procedure), a negative determination is made in step S101. In this case, step S104 and the subsequent steps are performed without carrying out the steps S102 or S103.

When the above-described drive force limiting process is in execution, the steps (S106 to S108), which are related to termination of the drive force limiting process, are performed. Through these steps, it is determined whether a required drive force, which is obtained as a function of the accelerator operating amount as the drive force that must be output from the drive source 1 in accordance with the accelerator operating amount, is less than a control drive force, which is the drive force limited through the drive force limiting process (S106: YES). For example, if the driver releases the accelerator pedal 6 from the ON state to the OFF state and the accelerator operating amount drops to zero, the required drive force decreases to a value less than the control drive force. In this case, a positive determination is made in step S106 and then the drive force limiting process is ended (S107) to stop limiting the drive force output from the drive source 1. After this point, the drive force output from the drive source 1 is adjusted to match the required drive force in accordance with the accelerator operating amount. Specifically, after the drive force limiting process is suspended, the flag F is set to zero (indicating that the procedure is currently suspended) (S108).

Figure 3:
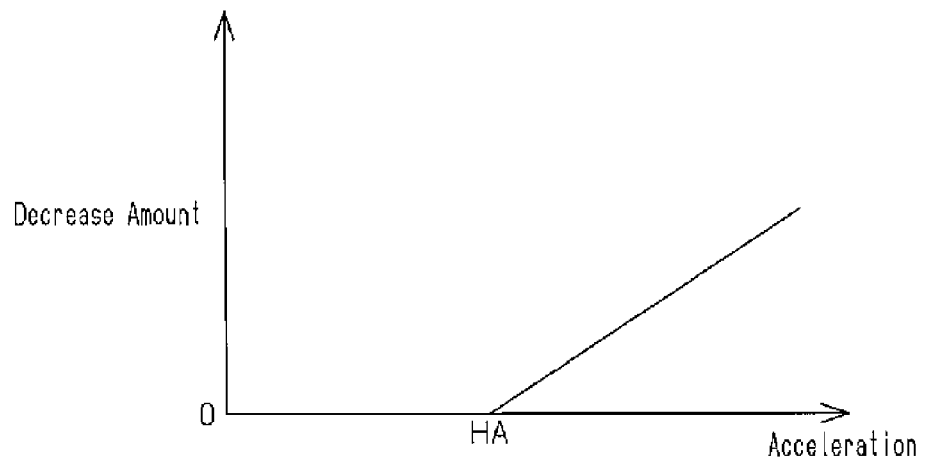
FIG. 3 is a graph representing the relationship between the decrease amount of the drive force and the acceleration of the automobile in the procedure.

The drive force limiting process in S104 of the drive force limiting routine will now be described in detail with reference to FIGS. 3 and 4.

In the drive force limiting process, the drive force produced by the drive source 1 is decreased by the amount corresponding to the decrease amount of the drive force. Accordingly, as the decrease amount increases, the degree of limiting of the drive force generated by the drive source 1 heightens in the drive force limiting process. The degree of limiting of the drive force of the drive source 1 in the drive force limiting process is changed in accordance with the acceleration of the automobile, which is determined using a detection signal provided by the traveling speed sensor 5. For example, as the acceleration of the automobile increases, the decrease amount is increased to heighten the degree of limiting of the drive force output from the drive source 1. More specifically, as illustrated in FIG. 3, for example, if the acceleration of the automobile is less than the determination value HA, the decrease amount is set to zero and the degree of limiting of the drive force of the drive source 1 is correspondingly set to zero. In contrast, when the acceleration of the automobile is greater than or equal to the determination value HA, the decrease amount increases with respect to zero as the acceleration increases with respect to the determination value HA. The degree of limiting of the drive force of the drive source 1 thus rises with respect to zero correspondingly.

By executing the drive force limiting process in the above-described manner, unnecessary decrease of the drive force generated by the drive source 1 is avoided and the drive force is decreased without causing the driver to feel strange. If the automobile is mired and needs to escape, and the driver repeatedly switches the shift lever 8 between a non-drive position and a drive position, such switching of the shift lever 8 from the non-drive position to the drive position may occur when the accelerator pedal 6 is held in the ON state. However, under this condition, the acceleration of the automobile tends to be low even when the shift lever 8 is switched from the non-drive position to the drive position with the accelerator pedal 6 maintained in the ON state. The degree of limiting of the drive force output from the drive source 1 is thus maintained low in the drive force limiting process. As a result, the operation to move the automobile out of a mire is prevented from being hampered by the drive force limited through the drive force limiting process. This improves drivability of the automobile for when, for example, the automobile is moved out of a mire.

Specifically, it is preferable that the determination value HA for the drive force limiting process is set variably in accordance with the traveling speed to an optimal value obtained in advance, for example, through experimentation. The determination value HA, which is variable as a function of the traveling speed, changes in accordance with the traveling speed, as represented by, for example, the solid lines in FIG. 4. As is clear from the graph, the determination value HA is maintained as the constant optimal value determined in advance through experimentation as long as the traveling speed is less than the predetermined value KB. If the traveling speed is greater than or equal to the value KB and smaller than the reference value KA, the determination value HA becomes gradually smaller as the traveling speed becomes greater. The determination value HA is set to zero for a traveling speed greater than or equal to the reference value KA. As a result, if the traveling speed is greater than or equal to the reference value KA, the drive force limiting process is executed without being influenced by the magnitude relationship between the acceleration of the automobile and the determination value HA. That is, the degree of limiting of the drive force of the drive source 1 is set to a value greater than zero as a function of the acceleration of the automobile. In other words, the decrease amount of the drive force of the drive source 1 is set to a value greater than zero in accordance with the acceleration of the automobile to heighten the degree of limiting of the drive force to a level greater than zero. As a result, when the traveling speed is greater than the reference value KA and thus the driver is likely to feel strange, the drive force limiting process is executed in such a manner as to adequately decrease the drive force output from the drive source 1 and prevent such strange sensation.

The illustrated embodiment has the advantages described below.

(1) To start the automobile quickly from a stopped state, the driver may inadvertently depress the accelerator pedal 6 from the OFF state to the ON state before switching the shift lever 8 from a non-drive position to a drive position. In this case, that is, if the shift lever 8 is switched from the non-drive position to the drive position with the accelerator pedal 6 held in the ON state, the drive force limiting process is carried out to decrease the drive force of the drive source 1 when the drive force is output from the drive source 1 in accordance with the accelerator operating amount. This prevents the automobile from being started by the drive force transmitted from the drive source 1 to the wheels 3 in response to the shift lever 8 switched from the non-drive position to the drive position in the above-described manner, thus preventing the driver from feeling strange. As a result, the strange sensation experienced by the driver caused at the time when the shift lever 8 is switched from the non-drive position to the drive position with the accelerator pedal 6 held in the ON state is prevented from happening. The drivability of the automobile is thus prevented from being lowered by such strange sensation experienced by the driver.

(2) In the drive force limiting process, the degree of limiting of the drive force output from the drive source 1 is changed as a function of the acceleration of the automobile. Specifically, when the acceleration of the automobile is less than the determination value HA, the degree of limiting of the drive force of the drive source 1 is set to zero. In contrast, if the acceleration of the automobile is greater than or equal to the determination value HA, the degree of limiting of the drive force output from the drive source 1 rises with respect to zero as the acceleration increases with respect to zero. Through the drive force limiting process performed in this manner, unnecessary decrease of the drive force generated by the drive source 1 is avoided and the drive force is decreased without causing the driver to experience a strange sensation.

(3) When the automobile needs to escape from a mire and the shift lever 8 is switched from a non-drive position to a drive position with the accelerator pedal 6 held in the ON state, the acceleration of the automobile tends to be low and thus the degree of limiting of the drive force of the drive source 1 is maintained low in the drive force limiting process. The operation to move the automobile out of a mire is thus prevented from being hampered by the drive force, which is limited through the drive force limiting process. This improves drivability of the automobile when, for example, the automobile is moved out of a mire.

(4) The determination value HA for the drive force limiting process is set variably in accordance with the traveling speed to an optimal value determined in advance, for example, through experimentation. When the traveling speed is greater than or equal to the reference value KA, the determination value HA is set to zero. As a result, as long as the traveling speed is greater than or equal to the reference value KA, the drive force limiting process is executed without being influenced by the magnitude relationship between the acceleration of the automobile and the determination value HA. The degree of limiting of the drive force output from the drive source 1 is thus increased in accordance with the acceleration of the automobile. As a result, when the traveling speed exceeds the reference value KA and thus the driver is likely to feel strange, the drive force limiting process is carried out to reliably decrease the drive force of the drive source 1 to prevent such strange sensation.

The illustrated embodiment may be modified to the forms described below.

Figure 4:
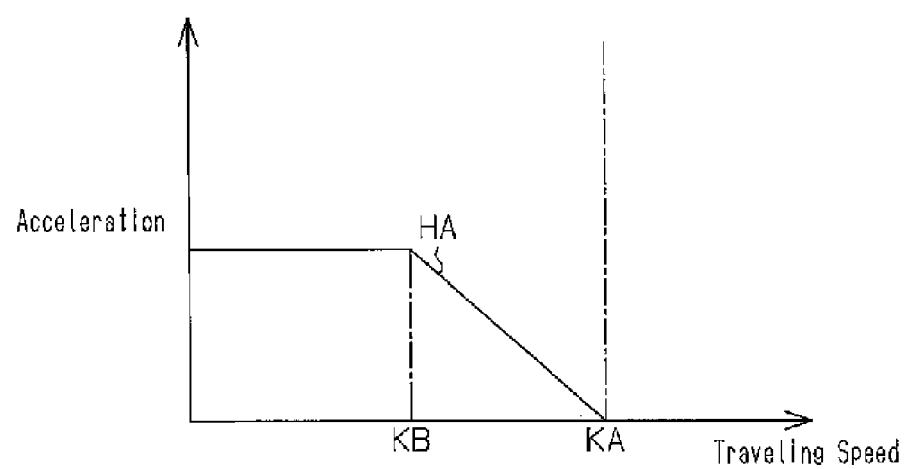
FIG. 4 is a graph representing the relationship between the determination value of the acceleration and the traveling speed of the automobile in the procedure.

Variable setting of the determination value HA in accordance with the traveling speed does not necessarily have to comply with the graph represented in FIG. 4 but may be carried out in any suitable manner modified as needed in accordance with any suitable type of data representing the automobile.

The determination value HA does not necessarily have to be variably set as a function of the traveling speed, but may be fixed to an optimal value determined, for example, through experimentation.

In the drive force limiting process, the decrease amount of the drive force is variably set in accordance with the acceleration of the automobile. Such variable setting of the decrease amount does not necessarily have comply with the graph represented in FIG. 3, but may be carried out in any suitable manner modified as needed in accordance with any suitable type of data representing the automobile. For example, when the acceleration is less than the determination value HA, the decrease amount may be variably set to a value greater than zero. Specifically, when the acceleration is less than the determination value HA, the decrease amount may be set to a constant value greater than zero or a variable value that increases as the acceleration increases. Alternatively, the decrease amount for the time when the acceleration is greater than or equal to the determination value HA may be set to a constant value greater than zero.

The decrease amount does not necessarily have to be variably set in accordance with the acceleration of the automobile, but may be fixed to an optimal value determined, for example, thorough experimentation. In this case, execution of the drive force limiting process decreases the drive force of the drive source 1 by the decrease amount that is set to the optimal value regardless of the acceleration of the automobile. As a result, when the drive force is decreased through the drive force limiting process, the degree of limiting of the drive force is maintained constant regardless of the acceleration of the automobile.

In step S103 of the drive force limiting routine shown in FIG. 2, the shift lever 8 may be determined to have been switched from a non-drive position to a drive position not only in the circumstances described above for the illustrated embodiment but also in, for example, the circumstances described below. Specifically, the determination may be made when the driver switches the shift lever 8 from the parking position to either the forward-gear position or the reverse position or from the neutral position to either the forward-gear position or the reverse position.

Any suitable shift mechanism other than the shift lever 8, such as a shift mechanism manipulated through buttons to switch between a drive position and a non-drive position, may be employed as the shift mechanism.

The internal combustion engine has been cited as the drive source 1 of the automobile. However, the drive source 1 may be a motor. Alternatively, a combination of an internal combustion engine and a motor may be employed collectively as the drive source 1. In this case, the internal combustion engine and the motor may be switched between each other or used in combination to serve as the drive source.

DESCRIPTION OF THE REFERENCE NUMERALS

1 . . . drive source, 2 . . . transmission, 3 . . . wheel, 4 . . . electronic control unit, 5 . . . traveling speed sensor, 6 . . . accelerator pedal, 7 . . . accelerator position sensor, 8 . . . shift lever, 9 . . . shift position sensor.

The invention claimed is:

1. A drive control device for a vehicle, comprising:
a control section that adjusts drive force output from a drive source in accordance with operation of an accelerator; and
a shift mechanism switched selectively to a drive position and a non-drive position, wherein
the drive control device is configured to transmit the drive force from the drive source to a wheel when the shift mechanism is arranged at the drive position,
the drive control device is configured to block transmission of the drive force from the drive source to the wheel when the shift mechanism is arranged at the non-drive position,
the control section is configured to execute a drive force limiting process through which the drive force output from the drive source is decreased when the shift mechanism is switched from the non-drive position to the drive position with the accelerator held in an ON state, and
when executing of the drive force limiting process, the control section changes a degree of limiting of the drive force output from the drive source in accordance with an acceleration of the vehicle.

2. The drive control device according to claim 1, wherein, when executing the drive force limiting process, the control section sets the degree of limiting of the drive force output from the drive source to zero if the acceleration of the vehicle is less than a determination value but to a level greater than zero when the acceleration of the vehicle is greater than or equal to the determination value.

3. The drive control device according to claim 2, wherein, when executing the drive force limiting process, the control section variably sets the determination value in accordance with a traveling speed of the vehicle.

4. The drive control device according to claim 2, wherein, if the traveling speed is greater than or equal to a reference value when executing the drive force limiting process, the control section sets the degree of limiting of the drive force output from the drive source to a level greater than zero without being influenced by the magnitude relationship between the acceleration of the vehicle and the determination value.

* * * * *